Feb. 13, 1951
M. M. RODIN
2,541,782
FISHING LURE
Filed June 18, 1948
2 Sheets-Sheet 1
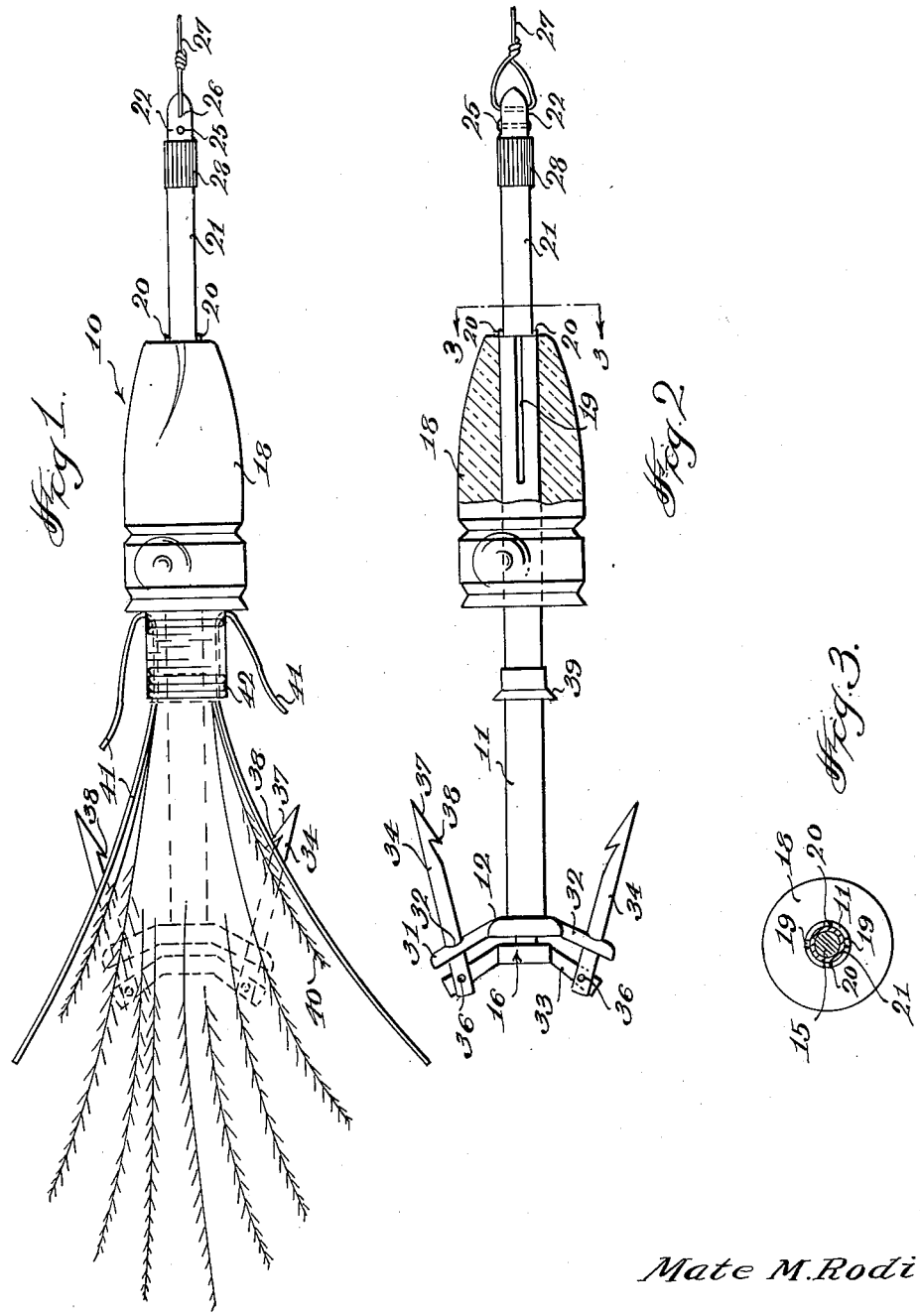
Inventor
*Mate M. Rodin*
By *John N. Randolph*
Attorney

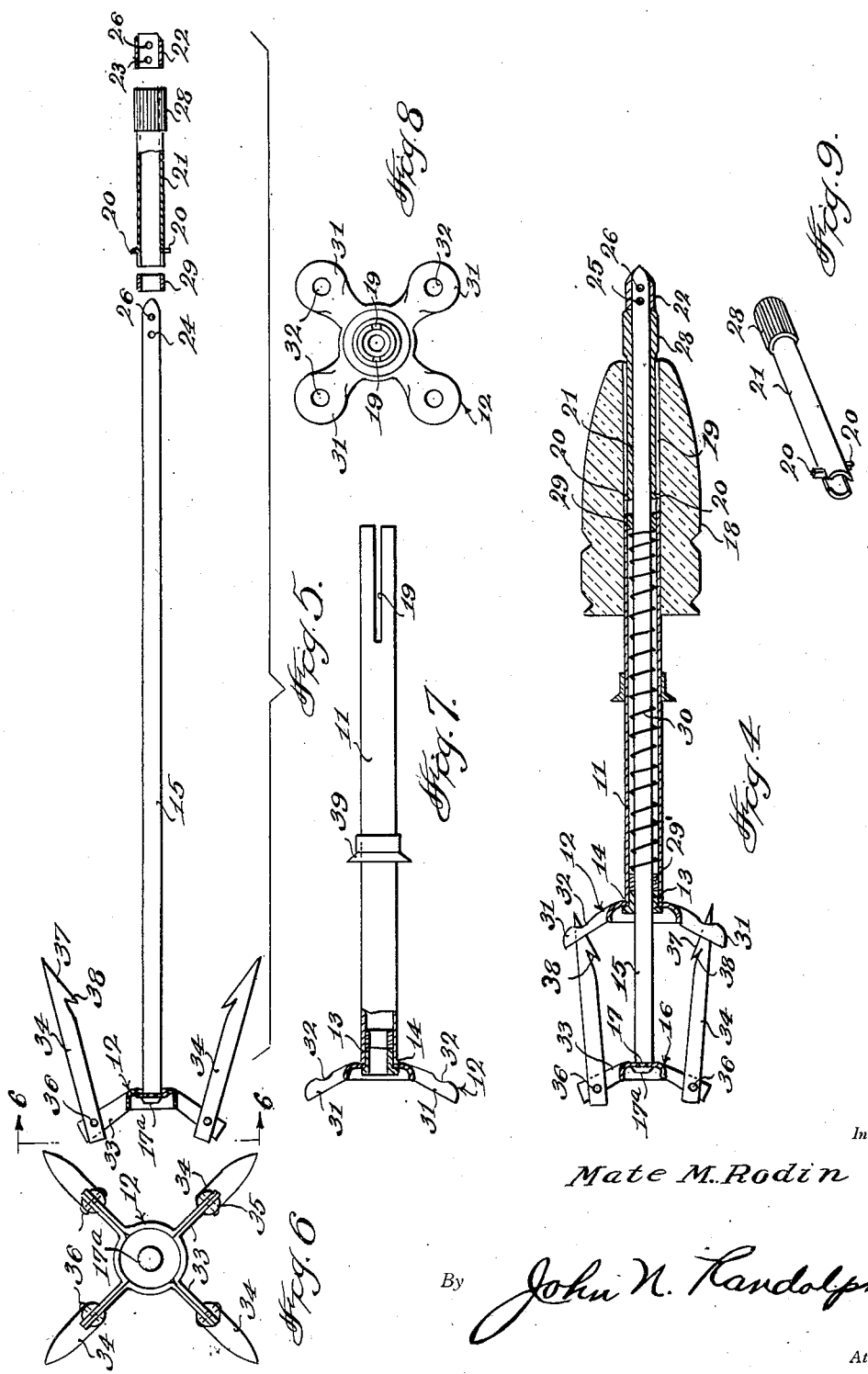

Patented Feb. 13, 1951

2,541,782

UNITED STATES PATENT OFFICE 2,541,782

FISHING LURE

Mate M. Rodin, San Pedro, Calif.

Application June 18, 1948, Serial No. 33,730

1 Claim. (Cl. 43—36)

This invention relates to a novel construction of fishing lure especially adapted for use in fishing for large game fish and has for its primary object to provide a lure provided with barbed spurs for use in hooking a fish in lieu of a conventional fishhook and which is so mounted that a game fish cannot release itself as by "straightening" a conventional hook.

Another and important object of the present invention is to provide a lure having means for moving the barbed spurs to retracted positions after a fish has been boated to free the lure for ready removal from the mouth of the fish.

Another object of the invention is to provide means for effectively locking the barbed spurs in projected positions while the lure is being trolled so that irrespective of how the lure is taken by a game fish, there will be no danger of the spurs being inadvertently retracted to released positions.

Still a further object of the invention is to provide a lure of the aforedescribed character which readily lends itself to use with colored feathers and other visual means of any variety and type for attracting different species of fish.

Various other objects and advantages of the invention will hereinafter become more fully apparent from the following description of the drawings, illustrating a presently preferred embodiment thereof, and wherein:

Figure 1 is a side elevational view showing the lure in an operative position as it would appear while being trolled;

Figure 2 is a view similar to Figure 1 but showing the lure body or head partly in section and the feathers or streamers removed;

Figure 3 is a cross sectional view taken substantially along a plane as indicated by the line 3—3 of Figure 2;

Figure 4 is a longitudinal central sectional view showing the spurs in retracted positions;

Figure 5 is an exploded side elevational view, partly in section of a portion of the lure;

Figure 6 is an end elevational view taken substantially along a plane as indicated by the line 6—6 of Figure 5;

Figure 7 is a side elevational view, partly in section, of a portion of the lure;

Figure 8 is an end elevational view looking from right to left of Figure 7, and

Figure 9 is a perspective view of another portion of the lure.

Referring more specifically to the drawings, the novel fish lure in its entirety is designated generally 10 and includes a sleeve 11 to the rear end of which is secured a guide spider 12 by means of a flanged bushing 13 the restricted portion of which is anchored suitably in the rear end of the sleeve 11 and extends through a central opening 14 of the spider 12 so that the central or hub portion of said spider is anchored between the flanged end or head of the bushing 13 and the adjacent end of the sleeve 11.

A rod 15 of a length greater than that of the sleeve 11 extends slidably through said sleeve from rear to front thereof and is loosely disposed therein and slidably supported by the bushing 13, as clearly illustrated in Figure 4. A spur supporting spider 16 has a central opening in the hub portion thereof which engages a restricted shank 17 on the rear end of the rod 15 and said spider 16 is secured to the rod 15 by a head 17a on the rear end of said shank 17.

The forward end of the sleeve 11 extends axially through a lure body or head 18 and is suitably anchored thereto. The lure body or head 18 may be formed of any suitable material, preferably a transparent or translucent plastic which is suitably colored and marked to simulate the head portion of a natural game fish bait. The forward portion of the sleeve 11 which is anchored in the axial bore of the body or head 18 is provided with diametrically opposite longitudinally extending slots 19 which open outwardly of the forward end of said sleeve 11 to receive studs 20 which are struck out from the rear end of a sleeve 21 and which are slidably disposed in said slots 20. The sleeve 21 is detachably mounted on the forward, leading end portion of the rod 15 and is secured detachably thereon by a collar 22 which engages the rod 15, forwardly of the sleeve 21 and which is provided with aligned openings 23 for registration with a diametrical opening 24 of the rod 15 for receiving a pin 25. The forward end of the collar 22 is tapered and externally beveled to form a continuation of the tapered tip, constituting the leading end of the rod 15. The collar 22 and rod 15, forwardly of the pin 25, are provided with registering openings 26 through which a leader 27 is adapted to be secured, as best illustrated in Figures 1 and 2. The forward end of the sleeve 21 is ribbed as seen at 28 to provide a finger hold, for a purpose which will hereinafter become apparent.

A sleeve 29 is slidably supported on the rod 15 and in the sleeve 11 behind the sleeve 21 and forms an abutment for one end of an expansion coiled spring 30 which is carried by the rod 15 and within the sleeve 11 and the opposite end of which bears against another sleeve 29' which seats against the bushing 13 for urging the rod 15 forwardly of the sleeve 11 and into a projected position, as illustrated in Figures 1 and 2.

The guide spider 12 and the spur supporting spider 16 are provided with corresponding number of radially projecting arms, preferably four as illustrated. The arms 31 of the guide spider 12 preferably extend outwardly and rearwardly and are provided with enlarged terminal portions having corresponding openings 32 therein. The arms 33 of the spur supporting spider 16, which likewise project outwardly and rearwardly are preferably folded and flattened as seen in Figure 6 and disposed in planes parallel to the axis of the lure 10 and are each adapted for supporting an elongated spur or prong 34 having a bifurcated rear end 35 for straddling its arm 33. A pin 36 extends through said furcations and through the arm 33 for pivotally supporting each spur or prong 34 on an arm of the spider 16. The spurs or prongs 34 are preferably substantially circular in cross section and are bevelled on their inner sides and at their forward free ends, as seen at 37 so that said spurs are pointed at their forward free ends and at their outer sides. Each spur 34 is notched on its inner side and adjacent its tapered portion 37 to provide a barb 38. As best illustrated in Figures 2 and 4, the openings 32 through which the forward ends of the spurs 34 project have their axes spaced a greater distance from the axis of the spider 12 than the pivots 36 are spaced from the axis of the spider 16 so that when the rod 15 is in a retracted position as seen in Figure 4, rearwardly of the sleeve 11, the forward end portions of the spurs 14 will be in engagement with the openings 32 and with the points of the spurs disposed inwardly of the outer portions of the arms 31. When the rod 15 is advanced forwardly of the sleeve 11 by the normal actions of the spring 30, as illustrated in Figure 2, it will be readily obvious that the spurs will slide forwardly through the openings 32 and will be caused to swing outwardly on their pivots 36 to assume projected positions in forwardly and outwardly diverging relationship to one another, and which constitutes the fishing position of the spurs or prongs 34.

A flange collar 39 is secured around the sleeve 11 behind and spaced from the head 18 and combines with said head to provide a means for anchoring feathers 40 and streamers 41 to the sleeve 11 behind the head 18 and which extend rearwardly therefrom and are secured to the sleeve by wrapping 42. The feathers and streamers may be of any desired color and are adapted to substantially camouflage the spurs 34 and to at least partially enclose said spurs and the spiders 12 and 16 and combine with the head 18 to simulate a natural bait.

The lure 10 in its normal position is disposed as seen in Figure 1 and with the rod 15 in a forwardmost position so that the sleeve 21 is disposed forwardly of the head 18 and with the projections 20 located forwardly of the forward end of the head 18 so that the ribbed portion 28 can be manually engaged for rotating the sleeve 21 slightly in either direction for misaligning the projections 20 with the slots 19 to thereby lock the rod 15 in a forward position to lock the spurs or prongs 34 in their projected, fishing positions of Figures 1 and 2. After a fish is caught and boated, the fisherman grasps the head 18 and the sleeve 21 and turns said sleeve relatively to the head until the projections 20 are aligned with the slots 19 so that the rod 15 can be forced rearwardly for retracting the spurs 34 into their positions of Figure 4, in which positions the spurs will disengage the mouth of the fish so that the lure can be readily removed therefrom.

Various modifications and changes are contemplated and may obviously be resorted to, without departing from the spirit or scope of the invention as hereinafter defined by the appended claim.

I claim as my invention:

A latch means and actuating device for a fishing lure comprising a rod having a rear end adapted to pivotally support a plurality of spurs thereon in radially spaced relationship to its axis, a guide sleeve through which the rod slidably extends having a rear end disposed forwardly of the rear end of the rod and adapted to support guide means thereon spaced a greater distance from the axis of the rod and guide sleeve than the pivots of the spurs through which the spurs slidably extend, said rod being longer than the guide sleeve and extending beyond each end thereof, the opposite, forward end of the guide sleeve having at least one longitudinal slot opening outwardly of said forward end, and a latch sleeve rotatably mounted on the opposite, forward end of the rod beyond the forward end of the guide sleeve, when the rear end of the rod and guide sleeve are adjacently disposed, and provided with a radially projecting stud engaging the forward end of the guide sleeve when misaligned with said slot to retain the rear ends of the rod and guide sleeve in adjacent positions for retaining the spurs in projected positions relatively to the guide means, said latch sleeve being turnable on the rod to align the slot and stud and being sized to slide into the guide sleeve when the stud is slidably engaged in the slot to allow the rod to slide longitudinally of the guide sleeve and rearwardly thereof to displace the rear end of the rod rearwardly and away from the rear end of the guide sleeve for retracting the spurs relatively to the guide means.

MATE M. RODIN.

REFERENCES CITED

The following references are of record in the file of this patent:

UNITED STATES PATENTS

| Number | Name | Date |
|---|---|---|
| 570,344 | Smith | Oct. 27, 1896 |
| 700,993 | Taylor | May 27, 1902 |
| 1,172,780 | Ferree | Feb. 22, 1916 |
| 1,803,560 | Rodin | May 5, 1931 |
| 1,803,561 | Rodin | May 5, 1931 |
| 2,107,489 | Marcelli | Feb. 8, 1938 |